United States Patent [19]

Busse et al.

[11] Patent Number: 5,727,895
[45] Date of Patent: Mar. 17, 1998

[54] LINE HOLDER FASTENING ARRANGEMENT ON A BRAKED WHEEL CONTROL ELEMENT

[75] Inventors: Raimund Busse, Weissenhorn; Roland Kaempf; Harald Liegert, both of Stuttgart; Hans Weisbarth, Renningen, all of Germany

[73] Assignee: Mercedes-Benz AG, Germany

[21] Appl. No.: 523,447

[22] Filed: Sep. 5, 1995

[30] Foreign Application Priority Data

Sep. 2, 1994 [DE] Germany .............. 44 31 247.4

[51] Int. Cl.⁶ ...................................... F16D 65/78
[52] U.S. Cl. .................. 403/24; 403/34; 403/405.1; 188/264 AA
[58] Field of Search .................... 403/24, 34, 206, 403/405.1, 404, 410; 188/264 AA; 301/6.9, 6.3

[56] References Cited

U.S. PATENT DOCUMENTS

| | | | |
|---|---|---|---|
| 1,952,967 | 3/1934 | Boughton | 301/6.3 X |
| 3,277,985 | 10/1966 | Caskey | 188/264 AA |
| 3,850,267 | 11/1974 | Odier | 188/264 AA X |
| 3,955,654 | 5/1976 | Lemonnier | 403/4 X |
| 4,005,768 | 2/1977 | Bubnasu et al. | 188/264 AA X |
| 4,135,764 | 1/1979 | Johnson et al. | 188/264 AA X |
| 4,226,304 | 10/1980 | Erdmann | 301/6.9 X |
| 4,317,508 | 3/1982 | Katagiri et al. | |
| 4,326,610 | 4/1982 | Mouza | 188/264 AA X |
| 4,503,944 | 3/1985 | Burckhardt et al. | 188/264 AA X |
| 4,757,883 | 7/1988 | Thiel et al. | 188/264 AA X |

FOREIGN PATENT DOCUMENTS

| | | |
|---|---|---|
| 1383257 | 11/1964 | France . |
| 35 42 376 A1 | 6/1987 | Germany . |
| 54-91589 | 6/1979 | Japan . |
| 675597 | 7/1952 | United Kingdom . |
| 755909 | 8/1956 | United Kingdom ........... 301/6.3 |
| 850770 | 10/1960 | United Kingdom ........... 188/264 AA |
| 2 040 375 | 8/1980 | United Kingdom . |

*Primary Examiner*—Harry C. Kim
*Attorney, Agent, or Firm*—Evenson, McKeown, Edwards, & Lenahan, P.L.L.C.

[57] ABSTRACT

An arrangement for fastening a line holder on a wheel control element of a braked wheel, with releasable fasteners by way of which a fastening limb of the line holder can be fixed on a mating surface of the wheel control element. In order to be able to provide brake cooling without excessively increasing the unsprung wheel mass or increasing the work involved in assembly to any considerable extent, a baffle arrangement for deflecting a flow of cooling air can be mounted on the wheel control element. The arrangement can be fixed simultaneously by the fasteners of the line holder.

8 Claims, 1 Drawing Sheet

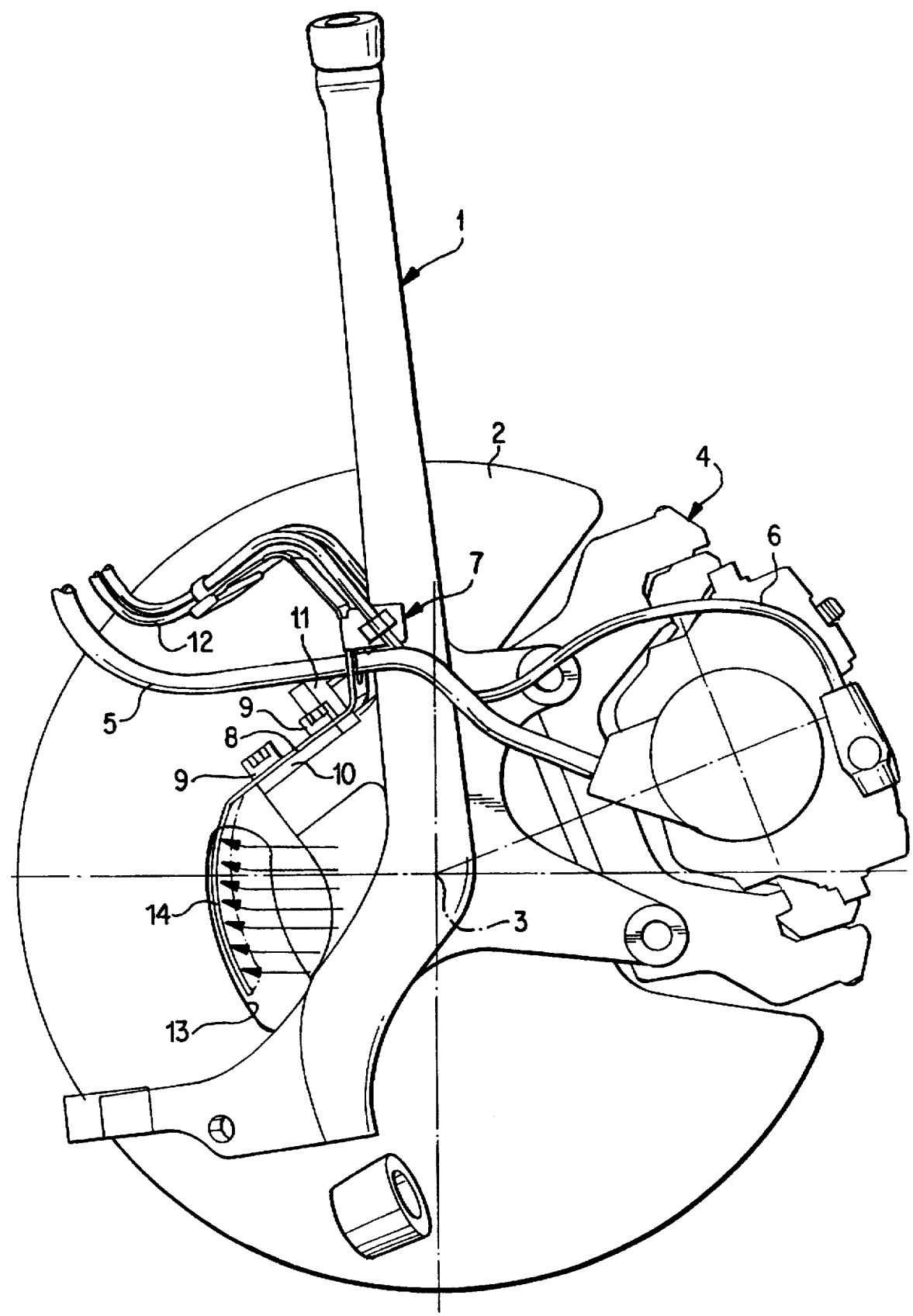

LINE HOLDER FASTENING ARRANGEMENT ON A BRAKED WHEEL CONTROL ELEMENT

BACKGROUND AND SUMMARY OF THE INVENTION

The present invention relates to an arrangement for fastening a line holder on a wheel control element of a braked wheel, and more particularly, to an arrangement by way of which a fastening limb of the line holder can be fixed on the mating surface of the wheel control element.

A fastening arrangement is customary in series construction of vehicles because the associated brake hose must be laid at a distance from rotating parts of the wheel. The line holder comprises a bent sheet-metal part, which is inexpensive to manufacture and the fastening limb of which can be clamped on a mating surface of the axle stub by two screws.

DE 35 42 376 A1 shows a baffle arrangement which is curved in a blade-like manner and serves to deflect a flow of cooling air onto a braking device of the associated wheel. The baffle arrangement has to be arranged on a wheel control element in a manner not explained in detail. A baffle arrangement of this kind would expediently be fastened, likewise releasably, to the wheel control element in order to permit problem-free replacement of the latter in the case, for example, of mechanical damage.

Mounting the line holder and the baffle arrangement on a wheel control element leads, however, to a considerable increase in the unsprung wheel mass and to a significantly greater amount of work for assembly.

An object on which the invention is based is to further develop a fastening arrangement which provides a device for brake cooling by the relative wind without an excessive increase in the unsprung wheel mass or a considerable increase in the amount of work involved in assembly.

This object has been achieved according to the present invention by providing that a baffle arrangement for deflecting a flow of cooling air mountable on the wheel control element such that said baffle arrangement is simultaneously fixable by the fastening apparatus.

BRIEF DESCRIPTION OF THE DRAWING

These and other objects, features and advantages of the present invention will become more readily apparent from the following detailed description thereof when taken in conjunction with the sole FIGURE which is a side view of an axle stub of a motor vehicle front wheel, with the axle stub carrying a disc brake.

DETAILED DESCRIPTION OF THE DRAWING

The axle stub designated generally by numeral 1 is shown separately, i.e. not in its installed position. A brake cover plate 2 is fixed immovably to the axle stub 1 on the wheel side, next to the axle stub 1, and has a customary circular or cup shape and is arranged coaxially with respect to the wheel rotation axis 3. An approximately segment-shaped opening is cut out of a forward, upper area of the circumference of the brake cover plate 2. A brake calliper 4 of conventional configuration is held in the opening by two forward-projecting lever arms of the axle stub 1. A brake hose 5 and a signal line 6 for a brake-pad wear indicator are led out of the brake calliper 4, being passed rearwards at a distance above the axis of rotation 3 and taken past the axle stub 1 on the side remote from the wheel.

To ensure the spaced installation of the brake hose 5 and the signal line 6, a line holder 7 consisting of a sheet-metal strip bent several times is used. As its bottom angled portion, the line holder 7 has a straight fastening limb 8 which is penetrated by two spaced holes and is screwed to a flat mating surface of the axle stub 1 by two hexagon-socket screws 9. This mating surface, which is provided with threaded holes, lies in a plane that slopes obliquely rearwards above and behind the rotation axis 3 and it runs approximately tangentially to a circular path around the rotation axis 3. This alignment makes it possible to use the hexagon-socket screws 9 simultaneously to fasten a flat parallel base 10 of an ABS sensor 11. The base 10 is clamped between the fastening limb 8 and the mating surface of the axle stub 1. Of course, it will also be recognized that the signal line 12 leading from the ABS sensor 11 to the control unit is likewise laid in a spaced manner by the line holder 7.

In order to permit improved relative-wind cooling of the internally ventilated disc brake and of the wheel bearing during driving, an elongate through-opening 13 is arranged approximately diagonally with respect to the brake calliper 4 in the rear lower area of the brake cover plate 2, between an inner circumference of the brake disc (not shown) and the outer circumference of the wheel bearing (not shown). The through-opening 13 is cut out of the brake cover plate 2 and is curved approximately parallel to the circular circumference of the brake cover plate 2 over its length.

To ensure that the cooling air coming from the vehicle travel direction is deflected axially through the through opening 13, a baffle 14 which is curved in a blade-like manner parallel to the through-opening 13 over its length, is arranged to the side of the through-opening 13. As indicated by broken lines, the baffle 14 likewise has a curved blade cross-section as seen over its cross-section. As a result, the cooling air, indicated by arrows, is deflected through a total of 90° and is thus guided through the through-opening 13 onto the brake disc.

The baffle 14 is formed in one piece with the line holder 7, projecting from the bottom end region of the fastening limb 8. The constructional unit is thus constructed overall as a bent sheet-metal part which is inexpensive to manufacture and can furthermore have a particularly low weight. As compared with components which are formed separately and have to be fastened separately, the constructional unit is distinguished not only by the favorable assembly costs but also by lower tool, component and bearing costs.

By virtue of the fact that the baffle 14 is mounted in a manner fixed to the axle stub and hence also to the wheel, the desired cooling also works with the wheels turned and with low cooling-air flow rates. Any worsening in the drag coefficient due to the baffle arrangement is virtually undetectable by metrological apparatus. This is particularly true if the cooling air is passed to the baffle 14 via a conventional air-guide channel integrated into the front skirt as described in DE 35 42 376 A1.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An arrangement for a braked wheel, said arrangement comprising a releasable fastening apparatus including a line holder configured to hold brake lines, a transversely projecting baffle arrangement mountable on a wheel control element and configured to deflect a flow of cooling air toward a braking device, and a fastening limb for releasably fastening and simultaneously fixing said line holder and said baffle arrangement to the wheel control element of the braked wheel.

2. The arrangement according to claim 1, wherein the line holder with the fastening limb and the baffle arrangement are one piece.

3. The arrangement according to claim 2, wherein the line holder and the baffle arrangement project from opposite end regions of the fastening limb.

4. The arrangement according to claim 2, wherein the line holder with the fastening limb and the baffle arrangement consist of a bent sheet-metal part.

5. The arrangement according to claim 1, wherein, as seen in cross-section, a curved guide-vane region of the baffle arrangement is extendable towards a through-opening of a brake cover plate for deflected cooling air.

6. The arrangement according to claim 1, wherein a base of an ABS sensor is simultaneously fixable by the fastening limb.

7. The arrangement according to claim 6, wherein the base is fixably clampable between the fastening limb and a mating surface of the wheel control element.

8. The arrangement according to claim 1, wherein a brake hose and at least one signal line are adapted to be laid in a predetermined manner via the line holder.

* * * * *